United States Patent
Brown

[15] 3,643,330
[45] Feb. 22, 1972

[54] CUTTERS FOR DRY SHAVERS

[72] Inventor: Norman J. Brown, Maidenhead, England

[73] Assignee: The Gillette Company, Boston, Mass.

[22] Filed: July 13, 1970

[21] Appl. No.: 54,649

[30] Foreign Application Priority Data

July 11, 1969 Great Britain......................35,030/69

[52] U.S. Cl.......................................30/346.51, 30/346.5 B
[51] Int. Cl............................................................B26b 19/04
[58] Field of Search .........30/43.92, 346.51, 346.53, 346.58, 30/346.16; 76/104

[56] References Cited

UNITED STATES PATENTS

| | | | |
|---|---|---|---|
| 2,285,015 | 6/1942 | Camfield | 30/43.92 |
| 2,869,310 | 1/1959 | Benson | 30/346.51 |
| 3,319,334 | 5/1967 | Bond | 30/43.92 |
| 3,178,818 | 4/1965 | Liska | 30/346.51 |
| 3,376,642 | 4/1968 | Liska | 30/346.51 |

Primary Examiner—Theron E. Condon
Assistant Examiner—J. C. Peters
Attorney—Philip Colman, Oistein J. Bratlie, William M. Anderson and Scott R. Foster

[57] ABSTRACT

This invention relates to a cutter for a dry shaver having a stationary outer arch shape shear plate and an inner reciprocating cutter that is formed as an integral molding of plastics material having a transversely curved convex surface for engaging the inner surface of the shear plate and presenting a plurality of transversely extending convexly curved cutting edges, at least the convex surface of the plastics molding being coated with a thin layer of metal, the cutting edges being formed by the metal of said layer. This form of cutter is cheaper to produce, lighter and stiffer, and easier to clean than conventional cutters.

2 Claims, 2 Drawing Figures

PATENTED FEB 22 1972 3,643,330

INVENTOR
Norman J. Brown

By *Ostein J Beatlie*

Attorney

CUTTERS FOR DRY SHAVERS

This invention relates to dry shavers comprising an apertured shear plate fixed to the body of the razor and a cutter which engages the inner face of the shear plate and is reciprocated rectilinearly to effect the cutting action, the shear plate being constituted by a thin flexible metal foil, formed with a multiplicity of small holes (each hole may have an area of about 0.25 mm.²) and held bent transversely into the form of an arch, while the longitudinally reciprocable cutter has a transversely curved convex surface for engaging the inner surface of the shear plate, said convex surface presenting a plurality of transversely extending curved cutting edges.

The form of cutter now usually employed in a dry shaver of the above character consists of a plurality of thin stainless steel blades, each shaped to conform to the interior cross section of the arched foil, which are held in spaced parallel relation by embedding them in a die-cast frame, or otherwise rigidly securing them to a frame, to which the reciprocating drive is connected.

In accordance with the present invention the cutter is formed as an integral molding of plastics material coated at least on said convex surface with a thin layer of metal, said cutting edges being formed by the metal of said layer.

A particular cutter construction in accordance with the invention is further described below with reference to the accompanying drawing in which.

Figure 1:
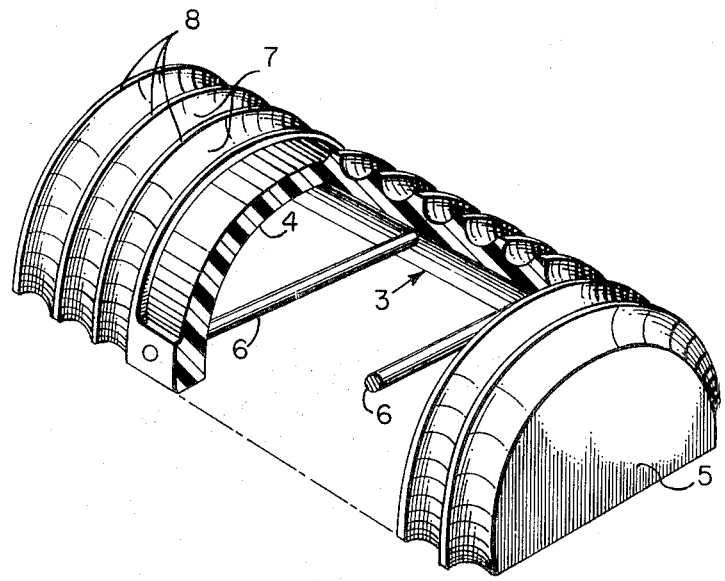
FIG. 1 is a perspective view of the cutter, with a part broken away.
Figure 2:
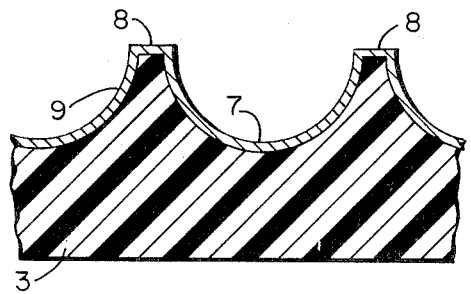
FIG. 2 is a fragmentary longitudinal section on a larger scale.

The cutter illustrated, which is intended for use with an arched foil shear plate of the character above described, comprises a body 3 formed by a one-piece molding of a plastics material suitable for subsequent electroplating, such as acrylonitrile/butadiene/styrene copolymer (A.B.S). The body has the general form of an inverted trough, having an arched wall 4, which is shaped to conform to the interior form of the arched foil and end walls 5, the underside of the body being open. As shown, a pair of metal pins 6 extend transversely between opposite sides of the arched wall to afford a connection to the drive mechanism but connection means of another character may be substituted. The outer surface of the arched wall of the body is formed with a plurality of parallel, circumferentially extending flutes 7 of rounded cross section, which are spaced apart axially of the cutter so that narrow circumferentially extending lands 8 are left between adjacent flutes.

The outer surface of at least the arched wall of the molded body is provided with an adherent layer 9 of hard metal by well-known electroplating techniques, as by first depositing a layer of copper, then a layer of nickel and finally a layer of chromium, which last layer may have a thickness of from 0.002 to 0.004 inch. The metal coating is then ground and/or lapped to form sharp cutting edges of the required form at the circumferentially extending edges of each of the lands 8, which thus constitute the blades of the cutter. In the case of a metal coating made up of a plurality of layers as described above, the grinding or lapping may, if desired, be carried out so as to remove the whole of the outer layer of metal, that is chromium, from the lands 8, provided that the chromium is retained on the sides of the flutes 7 immediately adjacent the lands 8 in order to form the necessary sharp cutting edges.

The integrally formed, electroplated plastics cutter described and illustrated is not only significantly cheaper to produce than an equivalent cutter of conventional construction, but is also lighter and stiffer than such a conventional cutter so that when used in a dry shaver noise and vibration are reduced. Moreover the new cutter is easier to clean as the shallow rounded flutes between adjacent blades do not trap hair clippings as do the spaces left between the blades of a conventional cutter.

I claim:

1. For use in an electric dry shaver having a stationary shear plate constituted by a thin and flexible metal foil formed with a multiplicity of apertures and held bent transversely into the form of an arch; a cutter for mounting within said arched shear plate and for rectilinear longitudinal reciprocation relative thereto, the cutter having a transversely curved convex surface for engaging the inner surface of the shear plate, said convex surface presenting a plurality of transversely extending convexly curved cutting edges, wherein the cutter is formed as an integral molding of plastics material coated at least on said convex surface with a thin layer of metal, said cutting edges being formed by the metal of the said layer.

2. A cutter in accordance with claim 1 wherein the transversely curved convex surface of the cutter is formed with a plurality of parallel transversely extending flutes of rounded cross section, spaced apart longitudinally of the cutter to leave narrow transversely extending lands between adjacent flutes, the edges of the said lands constituting said cutting edges.

* * * * *